March 7, 1933.  F. A. JONES  1,900,114
VEHICLE TRAILER TANK
Filed June 17, 1929
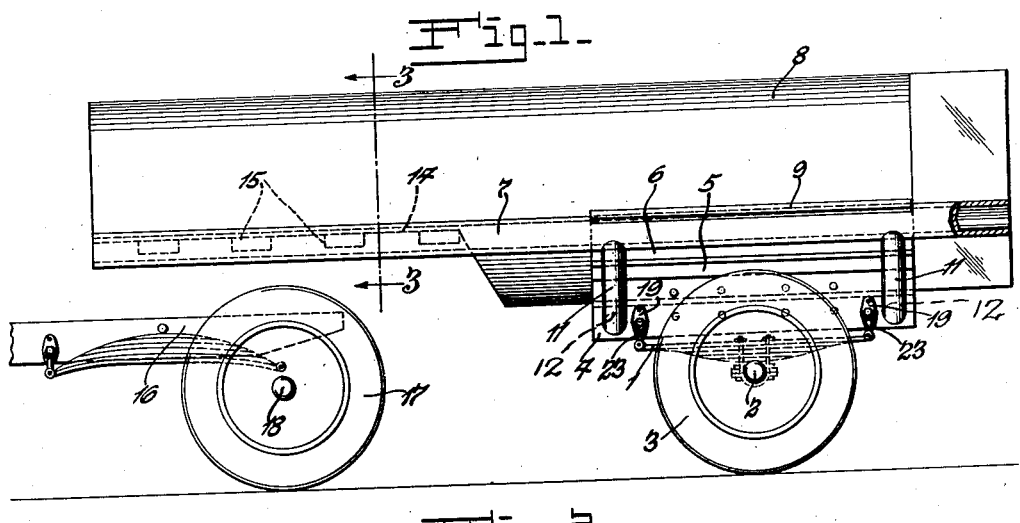
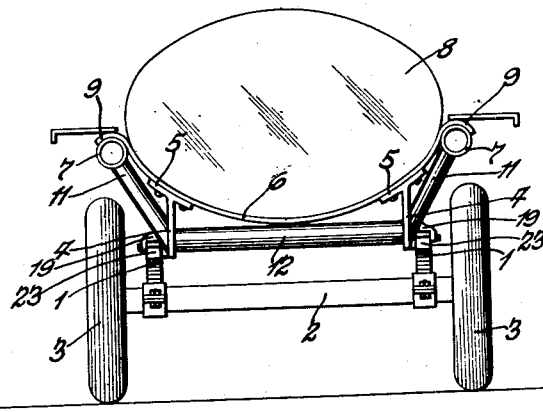
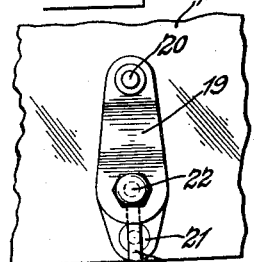
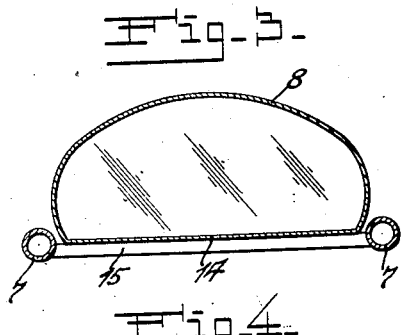
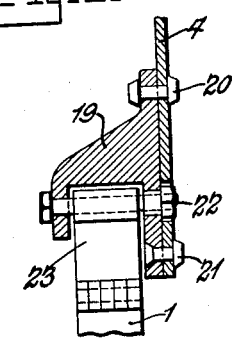
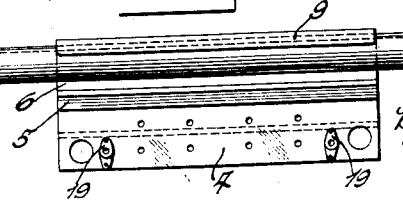
Inventor:
Frank Allison Jones
by Rippey & Kingsland
His Attorneys Patented Mar. 7, 1933

1,900,114

UNITED STATES PATENT OFFICE

FRANK ALLISON JONES, OF UNIVERSITY CITY, MISSOURI, ASSIGNOR TO SHELL PETROLEUM CORPORATION, A CORPORATION OF VIRGINIA

VEHICLE TRAILER TANK

Application filed June 17, 1929. Serial No. 371,435.

This invention relates to vehicle trailer tanks used for the transportation of liquid fuel, lubricants, and other liquids.

Objects of the invention are to provide an improved tank of the character and type and for the purpose mentioned, the construction and arrangement of which varies from the convention and known type in that the invention comprises means for obtaining an exceptionally low mounting for the tank which is impossible to obtain in trailers having tanks mounted on straight or drop frames; to provide a construction for obtaining a shorter hook-up and connection of the tank with the truck or tractor so as to reduce largely the distance between the axes of the wheels of the truck or tractor and the wheels supporting the trailer frame, thus shortening the turning radius, which is a highly advantageous and desirable feature in many places and under many conditions; to provide a new and improved device for supporting the tank on the trailer; to vary from known practice the construction and design of the tank proper to facilitate the accomplishment of these results and advantages; and to provide an improved trailer and tank possessing many or all of the improved features herein disclosed.

Various other objects and advantages of the invention will be made apparent to those skilled in the art from the following description, reference being made to the accompanying drawing in which Fig. 1 is a side elevation of my improved trailer and tank having the front end of the tank extended over the rear end of a truck or tractor.

Fig. 2 is a rear end elevation.

Fig. 3 is a cross sectional view of the tank on the line 3—3 of Fig. 1.

Fig. 4 is a side elevation of the supporting device for the rear end of the tank.

Fig. 5 is an enlarged vertical cross sectional view of a member used to connect the ends of the springs with the tank support.

Fig. 6 is a side elevation of said spring-connecting member.

The trailer in connection with which the present invention is embodied comprises springs 1 rigidly attached to a non-rotative axle 2 on the ends of which the wheels 3 are mounted for rotation.

Two side plates 4 have angular flanges 5 on their upper ends which are preferably curved slightly so as to conform to the curvature of and fit against the under side of a curved base member 6. This base member 6 constitutes a saddle for fitting against the under side of the oval wall of the tank and is preferably made of sheet metal and is attached to the parts 5. A frame comprising tubular side members 7 extending the full length of the tank 8 is engaged by the outwardly and downwardly curved upper edges 9 of the sheet metal saddle plate 6. The rear portions of the tubes 7 are supported by inclining tubes 11 connected by transverse tubes 12 extending through the plates 4. The lower portion of the saddle plate 6 rests upon the intermediate portions of the tubes 12. The tubes 7 are open at their rear ends and constitute receptacles or containers for the removable hose used in conducting the oil or other liquid contents of the tank 8 to places of delivery.

As shown in Figs. 1 and 3 the front portion of the tank 8 is formed with a flat bottom 14 equipped with attached blocks 15. The front end of the tank comprising the flat bottom 14 is designed and arranged to extend over the rear end of the truck frame 16 above or between the rear truck wheels 17. The blocks 15 are designed and intended to rest upon the fifth wheel as used with trailer attachments in the familiar manner and to be pivoted to the axis of the fifth wheel. As shown, there are four of these blocks 15 so that the trailer can be coupled with the truck in different adjustments in which the distance between the axis of the rear axle 18 of the truck and the axle 2 of the trailer is varied as desired and as necessary to extend or to reduce the turning radius.

This improved tank supporting frame may be connected with and supported upon the springs 1 in many different ways. The appropriate supporting connections shown comprise a pair of spring perches or brackets 19 attached to the plates 4 by rivets 20 and the lower portions are fastened by rivets 21, the heads of which are countersunk so as to be flush or in the same plane with the adjacent surfaces of the parts 19. Bolts 22 extend across the space between the arms of the perches or brackets 19. These bolts 22 pivotally support shackles 23, the lower ends of which are pivoted to the ends of the springs 1. Thus, a desirable connection between the springs 1 and the supporting frame is obtained. The bolts 22 are removable so as to permit the tank and the supporting frame therefor to be detached from the springs of the trailer.

From the foregoing it is now clear that my improved tank can be mounted on different types of axles, springs and wheel assemblies and that there is a low center of gravity because of the close hook-up of the parts and the low mounting of the tank and supporting saddle therefor on the trailer axle. This permits approximately even distribution of the weight as between the trailer axle and the truck or tractor and makes possible a much shorter turning radius than in other types of trailer tanks with which I am familiar. Other advantages are also obtained and do not require specific mention.

The construction may be widely varied within equivalent limits without departure from the nature and principle thereof. I do not restrict myself unessentially, but what I claim and desire to secure by Letters Patent is:—

1. A trailer device comprising a downwardly curved plate forming a saddle, a pair of transverse frame members supporting the intermediate portion of said saddle between the sides thereof, a pair of lateral plates supporting portions of said saddle laterally from said intermediate portion, a pair of longitudinal tubes supporting the marginal edges of said saddle, and means for supporting said tubes.

2. A vehicle comprising a downwardly curved plate forming a saddle, a pair of plates supporting intermediate portions of said saddle, a pair of longitudinal members supporting the marginal edges of said saddle, a tank having a bottom wall substantially fitting and supported by said saddle, and means for supporting said supporting plates and said longitudinal side members.

3. A vehicle comprising a downwardly curved plate forming a saddle, a pair of plates supporting intermediate portions of said saddle, a pair of longitudinal tubes open at their rear ends adapted to form a receptacle and supporting the marginal edges of said saddle, a tank having a bottom wall substantially fitting and supported by said saddle, and means for supporting said supporting plates and said tubes.

4. A vehicle comprising a downwardly curved plate forming a saddle, a pair of plates supporting intermediate portions of said saddle, a pair of longitudinal members supporting the marginal edges of said saddle, a tank having an oval rear portion and a flat bottom wall at its forward portion, the bottom wall of said oval rear portion being adapted to fit and to be supported by said saddle, an axle, means in cooperation with said axle adapted to support said supporting plates and said longitudinal members, and means in connection with the flat bottom wall of the forward portion of said tank for engagement by a coupling element.

FRANK ALLISON JONES.